May 22, 1951 H. A. MILOCHE 2,554,149

TRANSLATOR FOR CALLING LINE IDENTIFICATION

Filed July 8, 1948 2 Sheets-Sheet 1

INVENTOR
H. A. MILOCHE
BY P. C. Smith
ATTORNEY

TRANSLATOR FOR CALLING LINE IDENTIFICATION

Filed July 8, 1948 2 Sheets-Sheet 2

INVENTOR
H. A. MILOCHE
BY P. C. Smith
ATTORNEY

Patented May 22, 1951 2,554,149

UNITED STATES PATENT OFFICE 2,554,149

TRANSLATOR FOR CALLING LINE IDENTIFICATION

Herman A. Miloche, Teaneck, N. J., assignor to Bell Telephone Laboratories, Incorporated, New York, N. Y., a corporation of New York Application July 8, 1948, Serial No. 37,601

5 Claims. (Cl. 179—18)

Figure 1:
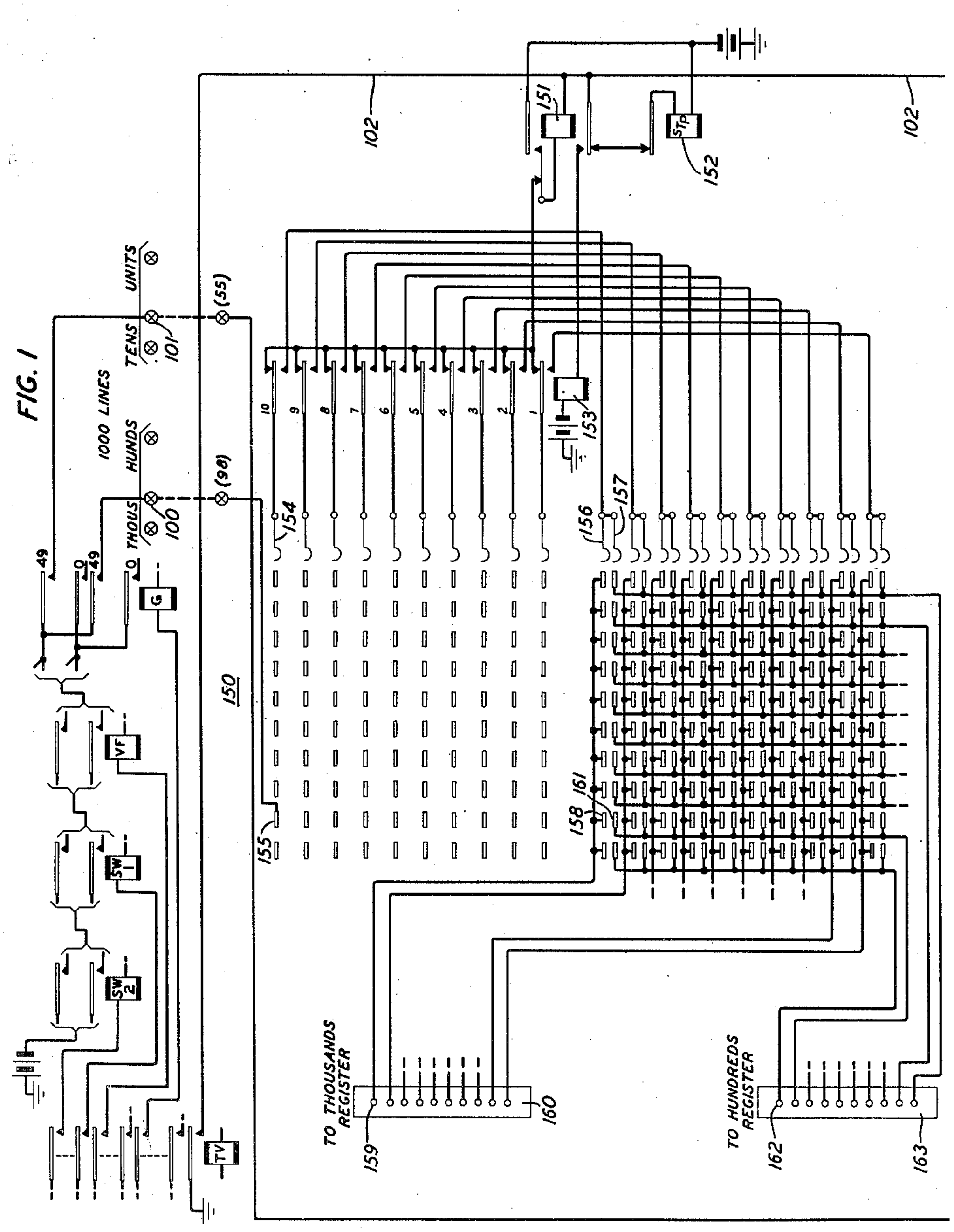

This invention relates to telephone systems and more particularly to those systems in which the numerical designation of a calling line is automatically determined and made available for recording purposes.

In automatic telephone systems it is necessary to have the identity of the calling station ascertained and transmitted to some point at which it may be recorded on registers for use in the control of automatic recorders if a printed bill or ticket is to be made with respect to a call made from the station. In the well-known cross-bar system, for example of the type disclosed in the application of W. W. Carpenter and R. E. Collis, Serial No. 759,402, filed July 7, 1947, each line entering an office has an equipment number determined by the location of the line on a terminal of a cross-bar switch. The calling line location is made in terms of the switch on the line-link frame, the vertical column, and the vertical file. Following the seizure of a sender, the sender determines which vertical column contains the line. The vertical column contains a vertical row of ten switches in which calling lines terminate. The sender then determines in which of the ten switches of the vertical row the line terminates and finally the vertical file of the particular switch. The calling line location is thus determined by the registration in the sender of five digits, three of which are the hundreds, tens and units digits of the vertical column number, the fourth of which is the switch or horizontal group number and the fifth of which is the vertical file number.

In order that the call may be billed or ticketed, the sender calls in a transverter to control a call recorder and transfers to it required information. With the information transferred to the transverter the transverter is then able to determine which of several translator frames can translate the calling line equipment number into its corresponding directory number. After seizing the proper translator frame, certain of the line location information may be transferred to the selected translator frame for use by it.

The present invention is particularly concerned with the provision of a translator which is capable of translating the equipment number of a calling line into the four numerical digits of the assigned directory number, and it is the object of the present invention to accomplish this translation in a simple and accurate manner.

To attain this object, the thousand punchings corresponding to the equipment numbers of one thousand lines are duplicated in two fields, one allocated to the ascertainment of the thousands and hundreds digits of the corresponding directory numbers of the one thousand lines and the other allocated to the ascertainment of the tens and units digits. For the translation of the equipment number of any one of the thousand lines, potential is connected over contacts of the register relays of the translator to a punching in each field allocated to the particular line for which translation is required.

Translation is obtained by the provision of two switches to the marking terminals of arcs of which the punchings are properly cross-connected. These switches may be of the general type disclosed in Patent 1,472,465 granted October 30, 1923, to O. F. Forsberg and R. M. De Vignier but are modified by the provision of thirty arcs of ten terminals each with a brush associated with each arc. The thousand punchings of the thousands and hundreds fields are selectively jumpered to the hundred marking terminals constituting ten of the arcs of one switch and the other twenty arcs of that switch are arranged in pairs with the terminals of the ten alternate arcs strapped together horizontally and connected to the ten terminals of a thousands register terminal strip and with the corresponding terminals of the other ten arcs strapped together vertically and connected to a hundreds register terminal strip. Similarly punchings of the tens and units field are selectively jumpered to the hundred marking terminals comprising ten of the arcs of the second switch and the other twenty arcs of the second switch are arranged in pairs with the terminals of the ten alternate arcs strapped together horizontally and connected to the ten terminals of a tens register terminal strip and with the corresponding terminals of the other ten arcs strapped together vertically and connected to the ten terminals of a units register terminal strip. The rotation of the brushes of the first switch until one of the hunting brushes engages the marking terminal of its associated arc to which marking potential has been applied from a line number equipment punching, will cause the hunting movement of the switch to be arrested whereupon the potential applied to the selected marking terminal is applied to a pair of the brushes associated with a pair of the other arcs of the switch to selectively apply potential to terminals of the thousands and hundreds register terminal strips. Likewise the rotation of the brushes of the second switch until one of the hunting brushes engages a marking terminal of its associated arc to which marking potential has been applied from a line number equipment punching, will cause the hunting movement of the second switch to be arrested whereupon the potential applied to the selected marking terminal is applied to a corresponding pair of the brushes associated with a pair of the other arcs of the switch to selectively apply potential to terminals of the tens and units register terminal strips.

Provision is made to start both switches in response to the seizure of the translator.

Figure 2:
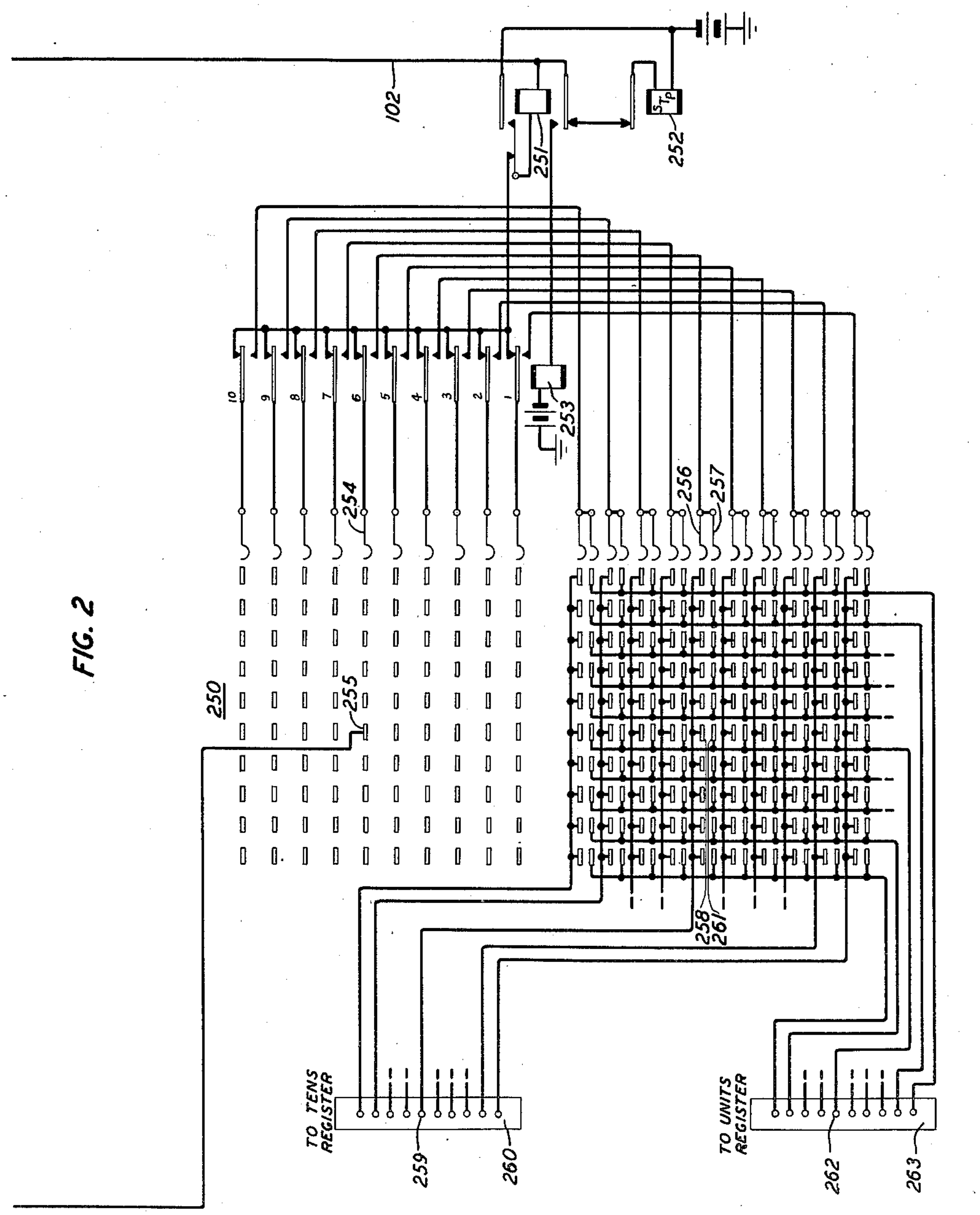

For a clearer conception of the scope and purpose of the invention, reference may be had to the following detailed description read in connection with the accompanying drawing in which:

Fig. 1 shows in the upper portion thereof a translator cut-in relay and the schematic representation of the register relays of the translator and in the lower portion thereof a first translator switch; and Fig. 2 shows a second translator switch.

For a complete disclosure of the invention Fig. 2 should be placed beneath Fig. 1.

Access to a translator is obtained through a connector relay, such as relay TV shown in Fig. 1. The connector relay extends connections to the translator over which any desired one of twenty vertical group relays may be operated. Each of these relays corresponds to a vertical group of fifty subscriber lines. One of these vertical group relays (G) is shown in Fig. 1. Relay TV also extends operating circuits to five SW relays operable on a two-out-of-five basis to register the horizontal group or switch location of any one of the thousand lines allocated to the particular translator, and also extends operating circuits to five vertical file (VF) relays operable one at a time to register the vertical file of the vertical group in which any one of the thousand lines is located. Through the conjoint operation of two of the SW relays, one of the VF relays and one of the G relays marking potential may be applied to any one of one thousand punchings corresponding to the thousand lines allocated to the translator.

In accordance with the present invention each of the G relays of each translator is provided with a second set of fifty contact pairs, multiplied on the input side so that potential over one contact pair may be applied to a punching in one field of one thousand punchings and potential applied over the multipled contact pair may be applied to a punching in a second field of one thousand punchings. Alternatively, instead of supplying a single relay with one hundred pairs of contacts grouped in two groups of fifty, two separate relays with their windings connected in parallel could be provided, each relay having fifty contact pairs.

It will be assumed that the translator shown in Figs. 1 and 2 has been seized and that through the operation of connector relay TV and register relays SW, VF and G, potential has been applied to punchings 100 and 101 of the two fields of punchings corresponding to the line equipment number terminal of a subscriber line whose directory number is 9855. The translator connector relay TV has also connected ground to start conductor 102 to start the operation of the switches 150 and 250.

The connection of ground to start conductor 102 establishes a circuit over the lower back contact of stop relay 151 of switch 150 and through the interrupter contacts and winding of stepping magnet 152 of switch 150 to battery, whereby magnet 152 operates in a self-interrupting circuit to advance the brushes of switch 150 over their respective arcs of terminals. When the brushes have been advanced into engagement with the No. 9 terminals of their arcs, brush 154 will find battery potential on the ninth terminal 155 of its arc, since such terminal is jumpered to the punching 100 indicative of the fact that the thousands and hundreds digits of the directory number of the line corresponding to the line equipment number punching 100 are 9 and 8, respectively. A circuit is thereby completed over the brush 154, over the upper No. 10 back contact of transfer relay 153 and through the normally closed transfer contacts and winding of stop relay 151 to ground on conductor 102. Relay 151 thereupon operates and locks directly to battery over its upper alternate contacts and at its lower back contact opens the circuit of stepping magnet 152 to arrest the further movement of the switch brushes. At its lower front contact relay 151 also establishes an obvious circuit for transfer relay 153 which, upon operating, opens at its No. 10 back contact the initial operating circuit for stop relay 151 and over its No. 10 front contact connects brush 154 to the pair of brushes 156 and 157.

A first circuit is now established from the source of potential connected to punching 100 thence over terminal 155, brush 154, the No. 10 front contact of relay 153, brush 156, terminal 158 and to the No. 9 terminal 159 on the thousands register terminal strip 160 indicative of the fact that the line has a thousandths directory digit 9. A second circuit is also established from the source of current connected to punching 100, thence over terminal 155, brush 154, the No. 10 front contact of relay 153, brush 157, terminal 161 and to the No. 8 terminal on the hundreds register terminal strip 163 indicative of the fact that the line has a hundreds directory digit 8.

The connection of ground to start conductor 102 also establishes a circuit over the lower back contact of stop relay 251 of switch 250 and through the interrupter contacts and winding of stepping magnet 252 of switch 250 to battery, whereupon magnet 252 operates in a self-interrupting circuit to advance the brushes of switch 250 over their respective arcs of terminals. When the brushes have been advanced into engagement with the No. 6 terminals of their arcs, brush 254 will find battery potential on the sixth terminal 255 of its arc, since such terminal has been jumpered to the punching 101 indicative of the fact that the tens and units digits of the directory number of the line corresponding to the line equipment number punching 101 are 5 and 5 respectively. A circuit is thereupon completed over the brush 254, over the upper No. 6 back contact of transfer relay 253 and through the normally closed transfer contacts and winding of stop relay 251 to ground on conductor 102. Relay 251 thereupon operates and locks directly to battery over its upper alternate contacts and at its lower back contact opens the circuit of stepping magnet 252 to arrest the further movement of the switch brushes. At its lower front contact relay 251 also establishes an obvious circuit for transfer relay 253 which upon operating opens at its No. 6 back contact the initial operating circuit for stop relay 251 and at its No. 6 front contact connects brush 254 to the pair of brushes 256 and 257.

A first circuit is now established from the source of current connected to punching 101, thence over terminal 255 and brush 254, the No. 6 front contact of relay 253, brush 256, terminal 258 and to the No. 5 terminal 259 on the tens register terminal strip 260 indicative of the fact that the line has a tens directory digit 5. A second circuit is also established from the source of current connected to punching 101, thence over terminal 255, brush 254, the No. 6 front contact of relay 253, brush 257, terminal 261 and to the No. 5 terminal 262 on the units register terminal strip 263 indicative of the fact that the line has a units directory digit 5.

Thus, it will be apparent that the connection of potential to any line equipment number punching of the thousands-hundreds field controls the operation of switch 150 to translate the equipment number into the thousands and hundreds digits of the directory number and the connection of potential to the corresponding line equipment number punching of the tens and units field controls the operation of switch 250 to translate the equipment number into the tens and units digits of the directory number.

When the translator is no longer required to translate the equipment terminal number of a line to the corresponding directory number, relay TV is released thereby releasing the operated register relays and removing ground from start conductor 102. The removal of ground from conductor 102 releases relays 151 and 153 of switch 150 and relays 251 and 253 of switch 250. These switches are now restored to their normal condition in which their brushes remain in engagement with the terminals of their respective arcs to which they have previously been advanced. The brushes will so remain until the translator is seized on another call and relay TV is reoperated to control the switches to make a translation of another line terminal equipment number into the corresponding directory number.

What is claimed is:

1. In a translating system, a plurality of punchings corresponding respectively to the identity of a plurality of subscribers' lines in accordance with one system of identification, means for applying marking potential to any one of said punchings, a step-by-step finder switch having a first bank of marking terminals connected to said punchings, means for causing the operation of said switch in a hunting movement to select a terminal to which marking potential has been applied from one of said punchings, register terminals grouped in accordance with two digits of a decimal system of identification, a second bank of terminals for said switch having one hundred pairs of coordinately arranged terminals strapped horizontally and connected to the terminals of one of said groups and strapped vertically and connected to the terminals of the other of said groups, and brushes having access to the terminals of said second bank whereby the positioning of said brushes in response to the hunting movement of said switch is effective to apply potential to a terminal in each of said register groups to define two digital values.

2. In a translating system, a plurality of punchings corresponding respectively to the identity of a plurality of subscribers' lines in accordance with one system of identification, means for applying marking potential to any one of said punchings, a step-by-step finder switch having a first bank of one hundred marking terminals connected to said punchings, means for causing the operation of said switch in a hunting movement to select a terminal to which marking potential has been applied from one of said punchings, register terminals grouped in accordance with two digits of a decimal system of identification, a second bank of terminals for said switch having one hundred pairs of coordinately arranged terminals, the upper terminals of each horizontal row of pairs being strapped together and connected to a terminal in one of said register groups, and the corresponding lower terminals of the pairs of each vetrical row being strapped together and connected to a terminal in the other of said register groups, and brushes having access to the terminals of said second bank whereby the positioning of said brushes in response to the hunting movement of the switch is effective to apply potential to a terminal in each of said register groups to define two digital values.

3. In a translating system, a plurality of punchings corresponding respectively to the identity of a plurality of subscribers' lines in accordance with one system of identification, means for applying marking potential to any one of said punchings, a step-by-step finder switch having a first bank of one hundred marking terminals arranged in ten rows of ten terminals each connected to said punchings, brushes cooperating respectively with said rows of terminals, means for causing the movement of said brushes over the terminals of their respective rows until one of said brushes engages a terminal to which marking potential has been applied from one of said punchings, register terminals grouped in accordance with two digits of a decimal system of identification, a second bank of terminals for said switch having one hundred pairs arranged in ten rows of ten pairs each, the upper terminals of each row of pairs being strapped together and connected to a terminal in one of said register groups and the corresponding lower terminals of the pairs of the several rows being strapped together and connected to terminals in the other of said register groups, pairs of brushes having access to the rows of pairs of terminals respectively, and means for applying potential from the marking terminal of one of said first ten rows of terminals over the brush engaged therewith and a pair of said latter brushes having access to a corresponding row of pairs of terminals whereby potential is connected to a terminal in each of said register groups indicative of the two digits allocated to the selected punching.

4. In a translating system, two fields of punchings, the corresponding punchings in said fields being allocated to a plurality of subscribers' lines, means for selectively applying marking potential to any pair of said punchings, a first step-by-step line switch having a plurality of marking terminals connected to the punchings of one of said fields, a second step-by-step finder switch having a plurality of marking terminals connected to the punchings of the other of said fields, means for causing the operation of each of said switches in a hunting movement to select a terminal to which marking potential has been applied from one of said punchings, register terminals grouped in accordance with the thousands, hundreds, tens and units digits of line numbers, and means controlled in the operation of said switches to selectively apply potential to said register terminals to define the four digits of the directory number of a line.

5. In a translating system, two fields of punchings the corresponding punchings in said fields being allocated to a plurality of subscribers' lines, means for selectively applying marking potential to any pair of said punchings, a first step-by-step finder switch having a first bank of one hundred marking terminals arranged in ten rows of ten terminals each connected to the punchings of one of said fields, brushes cooperating respectively with said rows of terminals, a second step-by-step finder switch having a first bank of one hundred terminals arranged in ten rows of ten terminals each connected to the punchings of the other of said fields, brushes cooperating respectively with the rows of terminals of said latter switch, means for causing the operation of each of said switches in a hunting movement to select a terminal to which marking potential has been applied from one of said punchings, register terminals grouped in accordance with thousands, hundreds, tens and units digits of line numbers, a second bank of terminals for said first switch having one hundred pairs arranged in ten rows of ten pairs each, the upper terminals of each row of pairs being strapped together and connected to a terminal in said thousands register group and the corresponding lower terminals of the pairs of the second several rows being strapped together and connected to terminals in the hundreds register group, pairs of brushes having access to the rows of pairs of terminals respectively, means for applying potential from the marking terminal of one of the first ten rows of said first switch over the brush engaged therewith and a pair of said latter brushes having access to a corresponding row of pairs of terminals whereby potential is connected to terminals in said thousands and hundreds groups indicative of the thousands and hundreds digits of the directory number of a line, a second bank of terminals for said second switch having its rows of pairs of terminals similarly arranged, strapped and connected to terminals of said tens and units register groups, pairs of brushes having access to the rows of pairs of terminals of said latter bank, and means for applying potential from the marking terminal of one of the first ten rows of said second switch over the brush engaged therewith and a pair of said latter brushes having access to a corresponding row of pairs of terminals of the second bank of said second switch whereby potential is connected to terminals in said tens and units groups indicative of the tens and units digits of the directory number of said line.

HERMAN A. MILOCHE.

REFERENCES CITED

The following references are of record in the file of this patent:

UNITED STATES PATENTS

| Number | Name | Date |
|---|---|---|
| 2,084,105 | Myers | June 15, 1937 |
| 2,289,939 | Stehlik | July 14, 1942 |
| 2,440,277 | Kruithof et al. | Apr. 27, 1948 |
| 2,454,770 | Cabes | Nov. 30, 1948 |
| T.M. 111,638 | | July 25, 1916 |

FOREIGN PATENTS

| Number | Country | Date |
|---|---|---|
| 530,614 | Great Britain | Dec. 16, 1940 |